United States Patent [19]

Lockwood et al.

[11] E Patent Number: Re. 32,115

[45] Reissued Date of Patent: Apr. 15, 1986

[54] SELF-SERVICE TERMINAL

[76] Inventors: Lawrence B. Lockwood, 5935 Folsom Dr., La Jolla, Calif. 92037; Michael Wells, 7290 Engineer Rd., San Diego, Calif. 92111; Henri J. A. Charmasson, 4550 Kearny Villa Rd., San Diego, Calif. 92123

[21] Appl. No.: 671,705

[22] Filed: Nov. 15, 1984

Related U.S. Patent Documents

Reissue of:

[64] Patent No.: 4,359,631
Issued: Nov. 16, 1982
Appl. No.: 168,953
Filed: Jul. 11, 1980

[51] Int. Cl.[4] ..... G06E 7/08

[52] U.S. Cl. ..... 235/381; 194/217; 358/115; 360/12

[58] Field of Search ..... 235/381; 360/12, 91, 360/92, 137; 358/93, 903, 115; 194/DIG. 5, DIG. 8, 12, 42, 2

[56] References Cited

U.S. PATENT DOCUMENTS

| | | | |
|---|---|---|---|
| 3,609,250 | 9/1971 | Morris | 360/12 X |
| 3,705,384 | 12/1972 | Wahlberg | 235/381 X |
| 4,070,698 | 1/1978 | Curtis et al. | 360/12 X |
| 4,173,024 | 10/1979 | Miller | 358/115 |
| 4,190,819 | 2/1980 | Burgyan | 360/12 X |
| 4,247,759 | 1/1981 | Yuris et al. | 235/381 |

*Primary Examiner*—David L. Trafton
*Attorney, Agent, or Firm*—Charmasson & Holz

[57] ABSTRACT

A self service terminal for dispensing voice and video information, printed documents, and goods; and for accepting service orders and payments therefor by currency or credit card. The terminal comprises a cathode ray tube display with mass storage for presenting information about the product or service sold, a keyboard for entry of customer requests, a printer for delivering coupons and tickets, a vending machine for dispensing small items, a coinbox and credit card reader for accepting payments for goods and services, and a telephone interface for communicating with the staff of a command center. The operation of the terminal is controlled by a microprocessor linked to an automated reservation system. The preferred embodiment of the invention is dedicated to the promotion and sale of travel services. The terminal is operated from three memory devices. A non-volatile memory is used to store the operating program for the terminal. A semi-permanent storage in the form of a video disc is used to hold the travel documentaries and other sales presentations. A randomly accessible mass storage is used to record flight schedules, hotel occupancy and other variables which are periodically updated from the command center via a phone line data communication link. The vending machine is used primarily for dispensing travel brochures, maps, foreign currencies and other goods related to the contemplated travel.

11 Claims, 11 Drawing Figures

FIG. 9
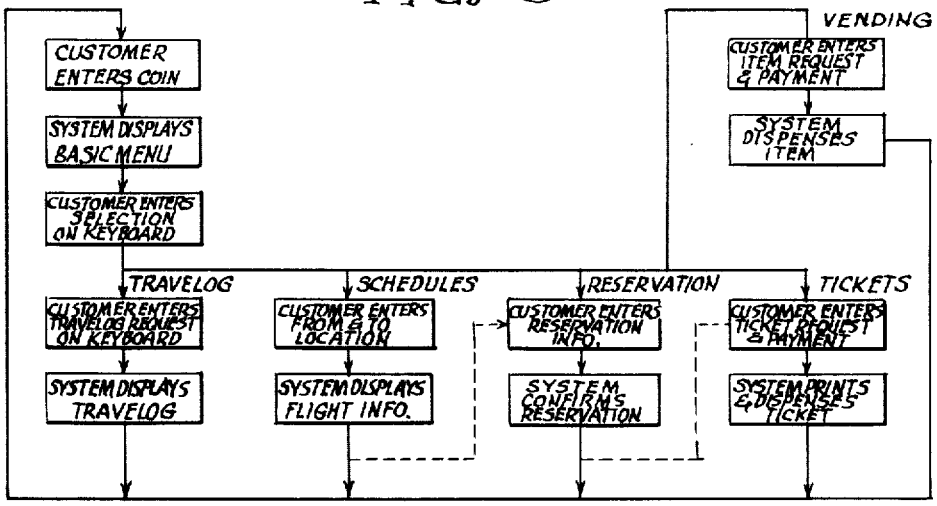
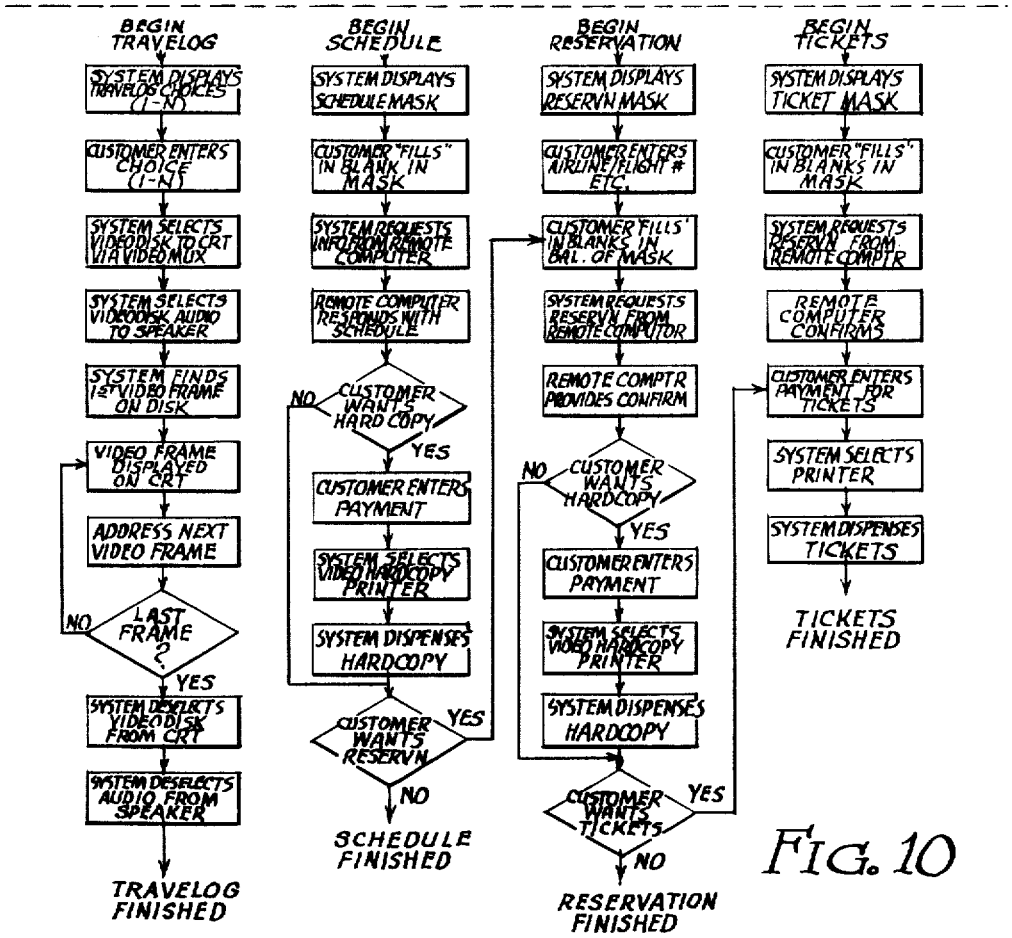
FIG. 10

SELF-SERVICE TERMINAL

Matter enclosed in heavy brackets [ ] appears in the original patent but forms no part of this reissue specification; matter printed in italics indicates the additions made by reissue.

*PRIOR APPLICATION*

*This is an application for reissue of U.S. Pat. No. 4,359,631 issued Nov. 16, 1982.*

DESCRIPTION

1. Field of the Invention

The invention relates first to automatic reservation and ticketing terminals; second, to programmed audio-visual displays used in connection with the sale of goods and services, and to automatic, around-the-clock service tellers.

2. Background of the Invention

In a service-oriented business such as a travel agency, the offices must be staffed with personnel working on a one-to-one basis with the customers, and using hundreds of travel brochures and scores of schedules and reservation manuals. The travel agent must verbally describe a destination, or show the customer a printed brochure, check schedules and reservation status, then physically write the tickets or coupons before collecting payments. The time and means devoted to the promotion of the service are very limited and depend upon the salesmanship of the office staff. Such agencies are usually located in business sections and not in places where people live, work, or frequent in their daily commuting routines. Yet studies have shown that as many as 80% of persons using a particular travel agency do so because of convenience. Therefore, the need has arisen for a new device capable of performing the promotion and sales of services such as those commonly dispensed by travel agencies, in a fully automated fashion and from easily accessible locations. The American public has been conditioned to receive most of its information via television. A high-quality audio-visual travelog can utilize practically all the human senses to motivate and influence a customer to select a particular vacation or destination. The general public is also becoming accustomed to self-service terminals from vending machines to automatic bank tellers.

The present invention ingeniously combines the features of audio-visual media presentation with those of self-service terminals to create a new and very efficient device for the promotion and distribution of goods and services.

SUMMARY OF THE INVENTION

The objectives of the instant invention are multiple and comprise, among others, the following:

Providing an automatic and efficient means for promoting and dispensing services to the general public on a twenty-four hours per day, seven-day per week, basis;

Reducing the overall cost of services by lowering personnel and office overhead;

Providing faster access to information and services from convenient locations among thoroughfares and in public buildings;

Achieving target marketing of services from specific locations frequented by selected demographic groups;

Offering merchandise related to the service promoted; for instance, dispensing, by coin insertion, travel-related products such as maps, books, guides and foreign currency, in conjunction with the sale and promotion of travel services.

Offering a customer a convenient means for evaluating a variety of products or services presented to him by an audio visual medium; for instance, by highlighting, describing and updating vacation destinations and programs;

Providing the public with convenient access to computerized mass information systems, reservation booking and ticketing networks as well as specialized data banks; and Providing for the on-the-spot payment for products or services by currency or credit cards.

These and other objectives are achieved in the implementation of a self-service terminal grouping a cathode ray tube for the audio-visual presentation of information, a document printer, a vending machine, a coin box, a credit card reader, a keyboard for the entry of customer inquiries and a controlling unit operating from a plurality of data sources either locally or remotely located.

BRIEF DESCRIPTION OF THE DRAWINGS

FIG. 9 is a top level system flow diagram; and

FIGS. 10 and 11 are a detailed flow diagram of the system.

DESCRIPTION OF THE PREFERRED EMBODIMENT

Figure 1:
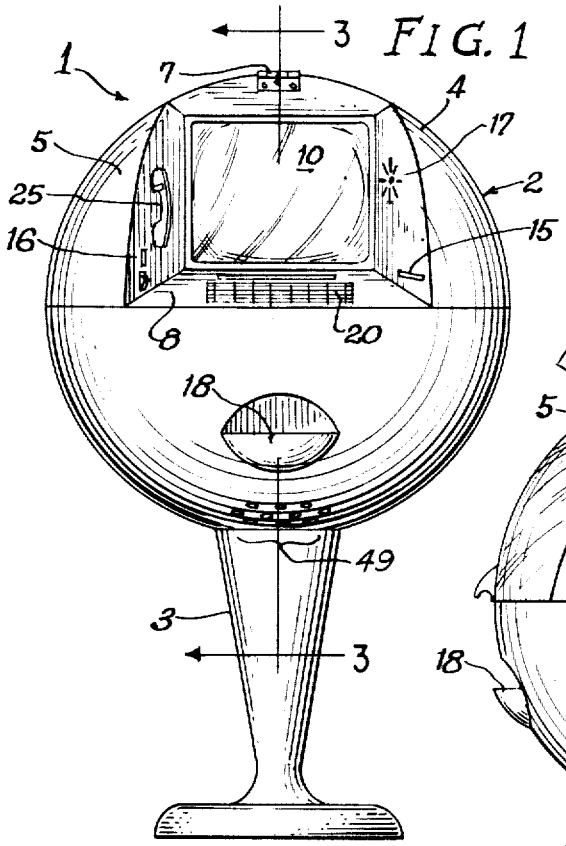
FIG. 1 is a front elevational view of the self-service terminal.
Figure 2:
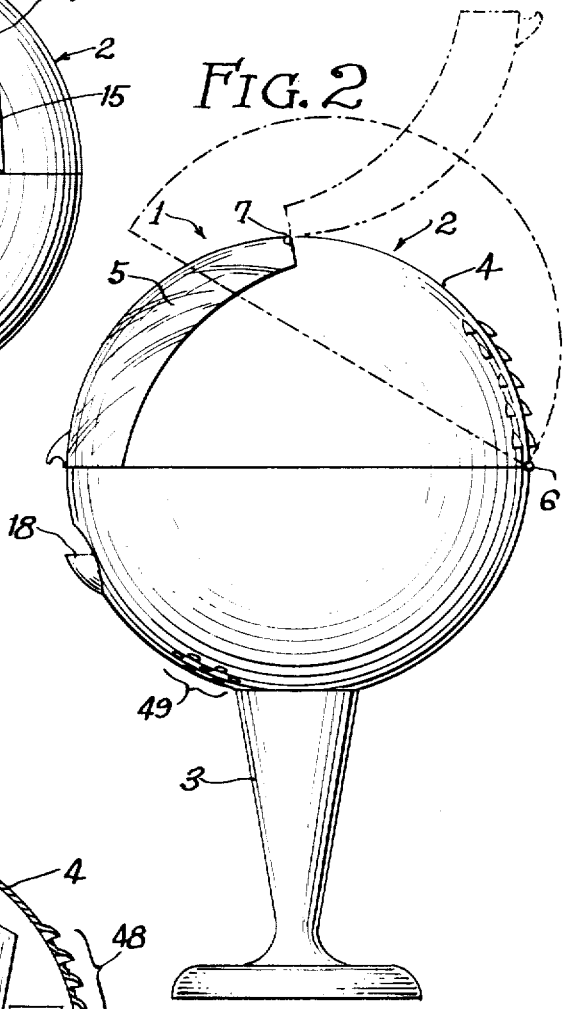
FIG. 2 is a right side view thereof.
Figure 3:
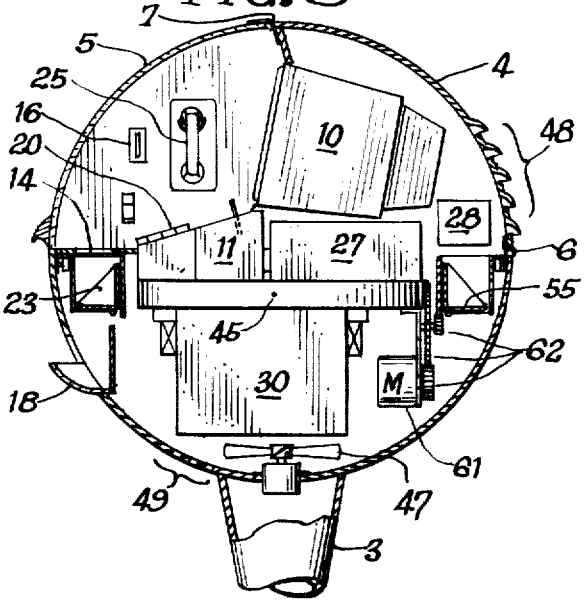
FIG. 3 is a side elevation view of the terminal, with part of the casing removed, taken along line 3—3 of FIG. 1.
Figure 4:
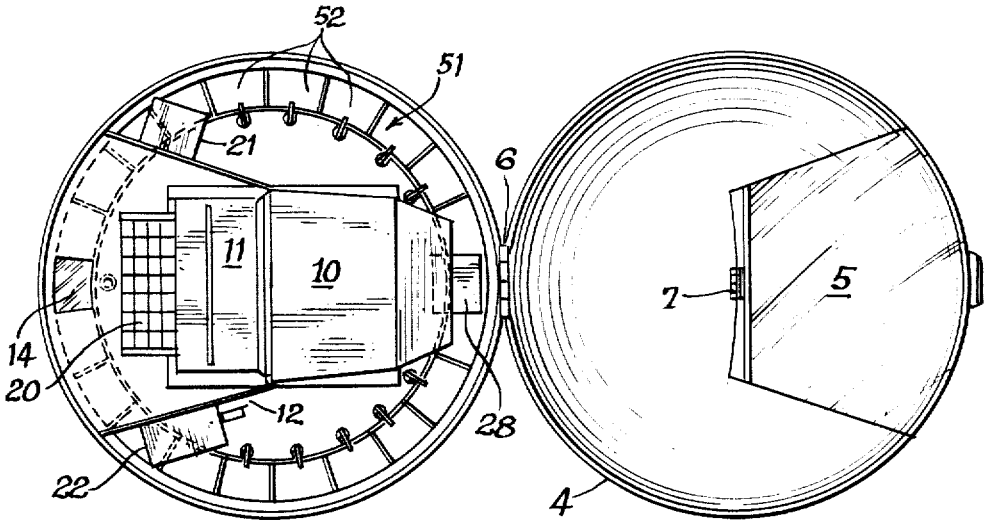
FIG. 4 is a top-plan view of the terminal with the upper hood in the open position.
Figure 5:
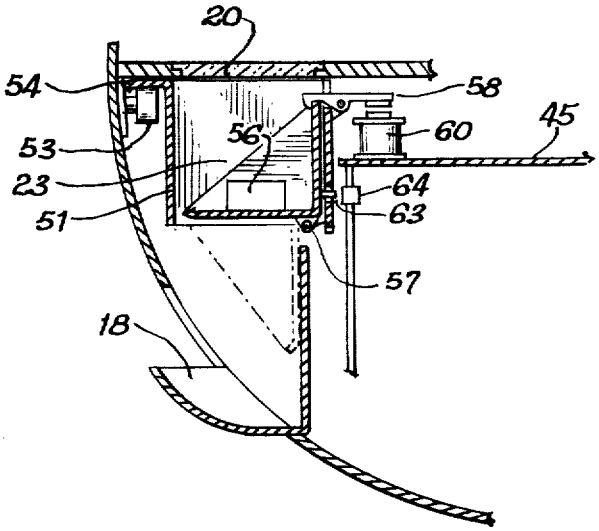
FIG. 5 is an enlarged cross sectional view of the dispenser distribution station.

Referring now to the drawing and according to the invention there is shown a self-service terminal 1 which is housed in a spherical enclosure 2 supported on a pedestal 3. The spherical enclosure 2 has a diameter of preferably 90 centimeters (36 inches) and extends to a height of 135 centimeters (54 inches). A transparent plexiglass door 5 covering approximately one quadrant of the upper hemisphere pivots around a hinge 7 located at the apex. The door 5 gives access to a cavity in which the various control elements of the terminal are grouped. On the slanted floor 8 of the cavity are a keyboard 20, a printer 11 and a small window 14 for viewing a goods dispenser 23. The backwall is occupied by the screen of a cathode ray tube 10. In the right wall are a credit card reader slot 15 and a loud speaker grid 17. A telephone hand set 25 and coin slot 16 appear on the left wall. A distribution pouch 18 associated with the goods dispenser is located on the lower hemisphere of the enclosure 2 immediately below the service cavity. A hood 4 comprising the upper hemispherical skin of the enclosure 2 can be rotated around hinge 6 to give access to the various components of the system. The terminal equipment is ventilated by air flowing from ventilation holes 49 at the bottom of the enclosure 2 to the vents 48 in the hood 4 under the action of fan 47.

Figure 7:
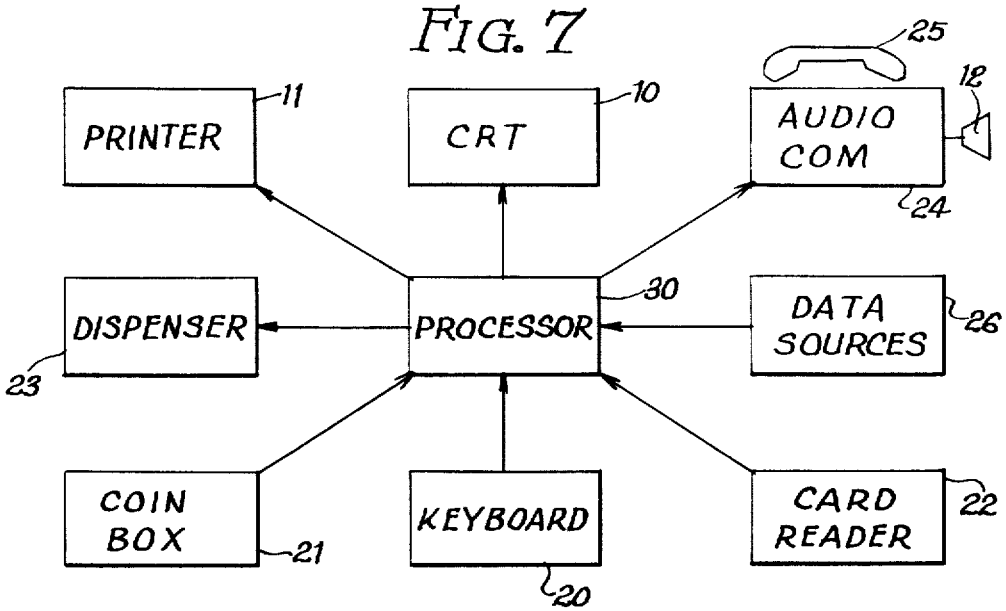
FIG. 7 is a general block diagram of the self-service terminal.
Figure 8:
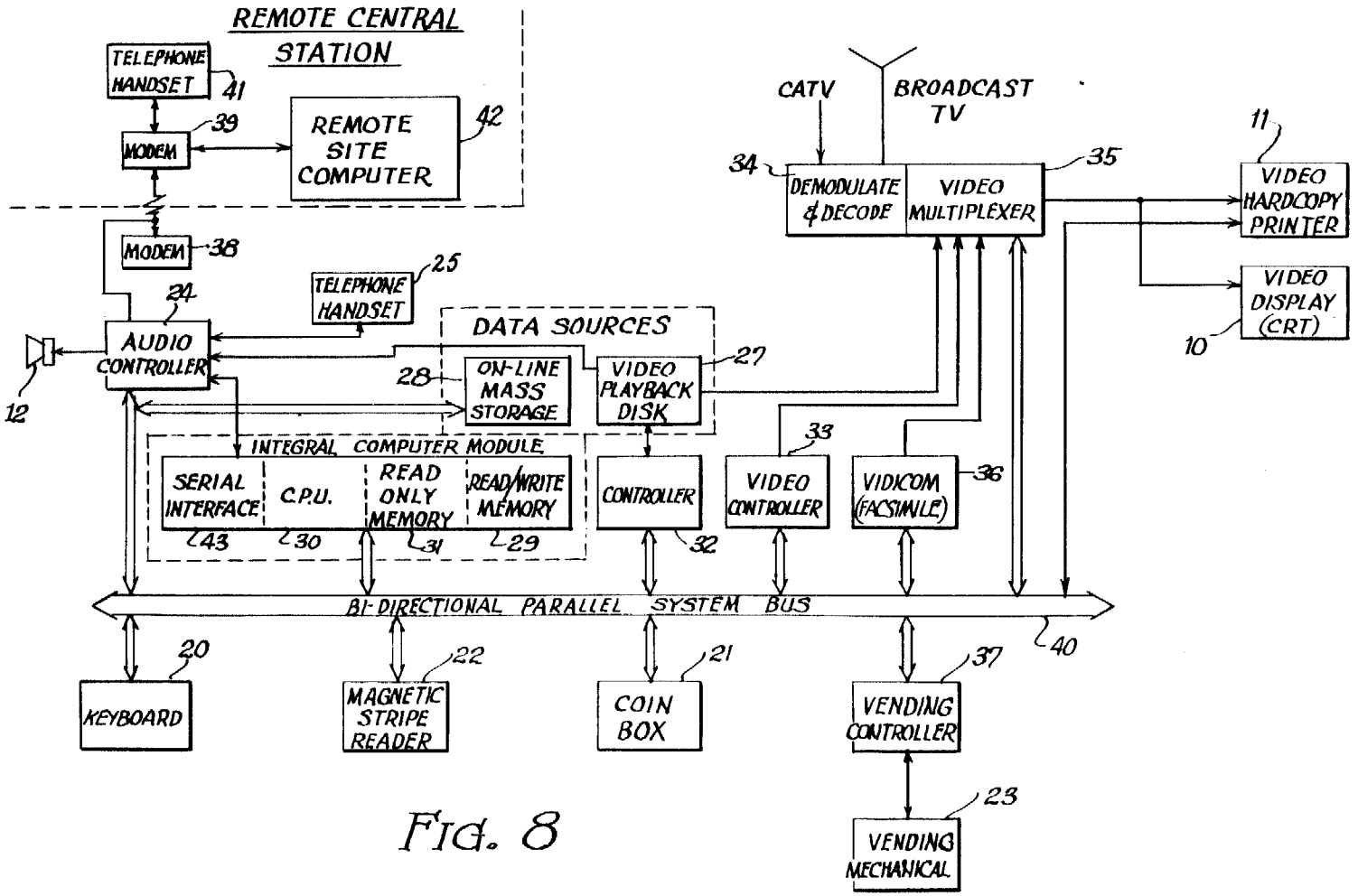
FIG. 8 is a detailed block diagram thereof.

The basic architecture of the self-service terminal can be best understood with reference to the general block diagram illustrated in FIG. 7. The system operates under the control of a data processor 30. The customer's input interface elements comprise the keyboard 20, a coinbox 21 and a credit card reader 22. Information is delivered to the customer through the CRT 10 and the page printer 11. Various items can be delivered by way of the dispenser 23. An audio communication link 24 associated with the telephone hand set 25 and a loud speaker 12 can be used to deliver voice information and to communicate with a remote service center. The processor 30 operates from a variety of data sources 26 as explained below. A more detailed layout of the system is illustrated in FIG. 8.

The present embodiment of the invention is designed to provide travel-related information and services. The first component of the data source 26 is a video storage and playback unit 27 which holds recordings of various travel documentaries promoting tours, cruises, special events, resort facilities and other vacation opportunities. Each documentary is indexed and can be recalled on demand and played on the cathode ray tube 10. A second source of data is provided by a mass storage unit 28 which contains information of a more transitory nature such as flight schedules to various destinations, ticket prices, weather information, snow conditions at various skiing resorts, hotel occupancy status and other information useful in the planning of a business trip or vacation. This information is periodically updated via a communication link 24 with a remote control center. The information contained in the mass storage unit 28 can be selectively displayed in alpha numerical form on the CRT 10. The CRT can also be used to display regular broadcasted television programs as well as scheduled and private cable television productions. Any information or image displayed on the CRT 10 can also be delivered in a hard copy form by a printer 11. All requests for services or information are entered by the customer via the keyboard 20. Payments for the services may be effected either by depositing coins in the coinbox 21 or by charging it to a credit card account after validation of the credit card through the magnetic strip card reader 22. A small number of travel-related goods such as travel guides, maps, sunglasses, foreign currency, may be purchased on the spot by way of the goods dispenser 23.

Figure 6:
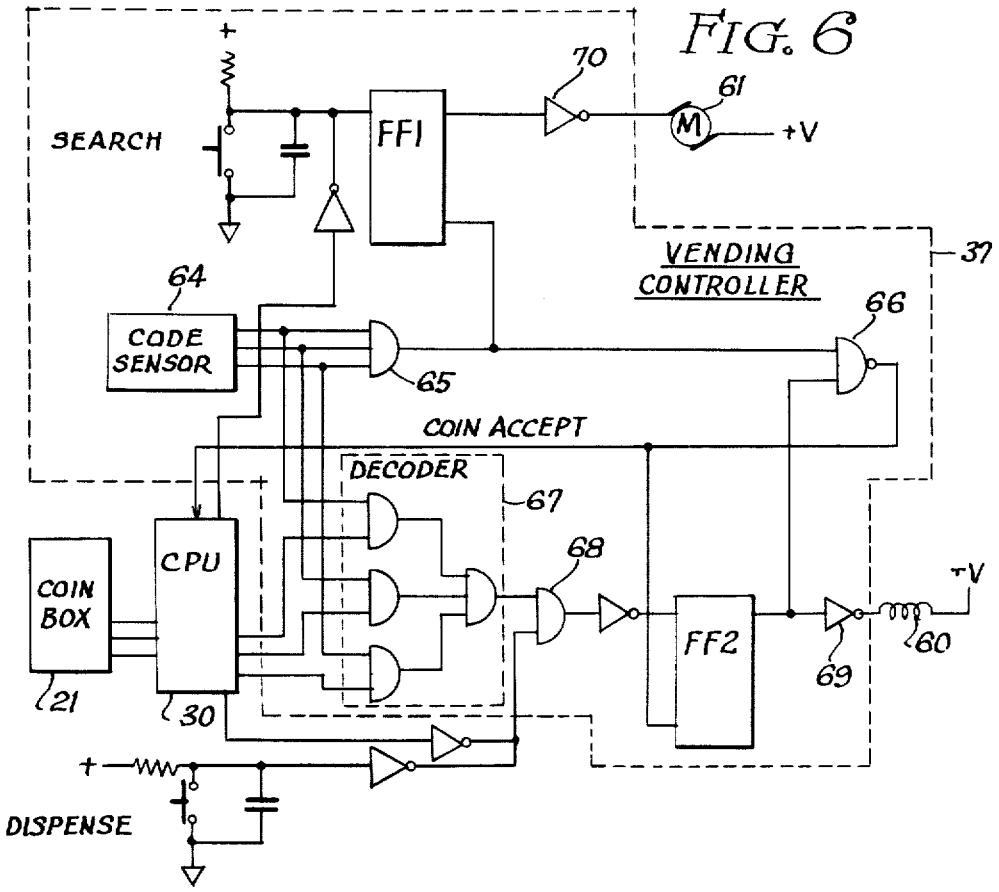
FIG. 6 is the electrical schematic of the goods dispenser.

The [good] *goods* dispenser 23 described with reference to FIGS. 1 through 6, comprises a rotating carousel 51 which surrounds the various elements of the system about the equatorial zone within the enclosure 2. The carousel is divided in a plurality of stations 52 and is supported by a peripheral flange 54 riding over rollers 53 mounted against the skin of the enclosure 2. Each of the stations 52 is open at the bottom and houses a hopper 55 holding one or more items 56 to be dispensed. The hopper 55 has a triangular shape and is supported by a hinge 57 at one of the lower corners of the station. The hopper is held in place by a spring-tensioned latch 58. When the latch 58 is pulled, the hopper 55 rotates downward around hinge 57 and drops the goods 56 into the distribution pouch 18. The latch 58 is released under the pull of a solenoid 60. A single solenoid 60 located on the forward edge of the equipment-supporting shelf 45 guarantees that the goods are always dropped in the distribution pouch 18. The carousel 51 is rotated by means of an electrical motor 61 via a set of gears 62. Each station 52 is identified by a code imbedded in a magnetic strip 63 in the back of each hopper. A sensor 64 located below the solenoid 60 reads identification codes of the stations from the magnetic strips during the movement of the carousel 51. The goods dispenser 23 is operated by means of a vending controller 37 of which FIG. 6 is a functional block diagram.

The electrical motor 61 during the carousel 51 is energized through driver 70 when the flip-flop FF1 is set upon depressing the SEARCH pushbutton located on the keyboard 20. The flip-flop FF1 will remain set and the carousel will continue to rotate as long as the SEARCH pushbutton is held down. After the search pushbutton has been released, the carousel will stop when flip-flop FF1 is reset as soon as one of the station codes is detected by the code sensor 64 and OR gate 65. The guarantees that the carousel will always stop with a loaded station properly aligned below the viewing window 14 and with its latching lever 58 positioned above the solenoid 60. The coinbox 21 has the ability to generate a code corresponding to the amount of change which has been deposited therein. This information is sent to the central processor 30. The central processor in turn generates a code compatible with the identification code of one or more stations. These stations are presumed to contain goods whose cost is equal to the amount of change recognized by the coinbox 21. If the code of the station which is positioned below the viewing window coincides to the code issued by the central processor, the decoding gates 67 generate a signal which enables AND gate 68. The signal generated by the depressing of DISPENSE pushbutton is routed through gate 68 to set flip-flop FF2. The output of flip-flop FF2 energizes the solenoid 60 by way of driver 69. This causes a release of the latch 58 holding the hopper 55 of the station and the unloading of the goods into the distribution pocket 18. [Flip-flop FF2 energizes the solenoid 60 by way of driver 69. This causes a release of the latch 58 holding the hopper 55 of the station and the unloading of the goods into the distribution pocket 18.] A COIN ACCEPT signal is generated through gate 66 and sent through the central processor 30 toward the coinbox 21. The COIN ACCEPT signal also resets flip-flop FF2, returning the system to its standby mode.

In order to provide the maximum flexibility in the utilization of the various components of the automatic service terminal and to allow for future expansion, the entire system is managed through the central processor 30. This central processor 30 is used to interpret the complex inputs generated by the customer via the keyboard 20, the coinbox 21, and for credit card reader 22, as well as those generated from the remote site and communicated via the audio communication unit 24. The operating program of the central processor 30 is stored in a non-volatile read only memory 31. This memory contains the programmed code numbers necessary to direct the computer or microcomputer to perform the various functions of the terminal. Intermediate results, variables, etc., required by the operating program, will reside in the read/write memory 29. Both the read only memory 31 and the read/write memory 29 are an integral part with the central processor 30. As implied by the block diagram of FIG. 8, the terminal system employs a bi-directional parallel bus oriented input/output structure. The exact specifications of the bus are typically a function of the central processor and one of the standard types well known by people skilled in the art. The advantage of the bus structure is not only to accommodate the various terminal components, but also to provide for addition of other devices that may be later necessary to suport future terminal features. The terminal system is basically a locally controlled device as explained before. A remote interface is also provided for the following features:

Monitoring of the operational status of the terminal system by remote site computer 42;

Updating the variable data kept in a mass storage unit 28; and

Programming of additional features of capability of the terminal system.

The central processor selected for this embodiment of the invention is an INTEL Model 80/20, single board computer. This instrument, in addition to the basic central processor 30, features a bi-directional standardized bus support 40 integral read only and read/write memories, integral bi-directional serial channel [42] *43* for remote communications, multiple, integral, parallel input/output and control lines, and an integral timer system.

The display system consists of various modules, parts of which are capable of receiving data and commands from the central processor 30 via the parallel bus 40. Five distinct modules comprise the display system.

The CRT display device 10, capable of receiving electrical signals and transferring them into visual representation on the viewing screen.

A video playback module 27, which can retrieve, and cause to be output, visual images and audio information which is stored on a removable media.

A video frame presentation module (vidicom) 36, which can receive data, interpret it as a series of dots, and cause to be displayed an image represented by the presence or absence of dots.

A video controller module 33, which can receive data and commands, and cause to be displayed, alpha numerical information, symbols, graphic information, etc., typically associated with texts or word-oriented applications; and A video multiplexer module 35, which can be instructed to select one of the above modules video outputs and direct it to the CRT display device.

As a separate input, the video multiplexer module 35 also is capable of presenting a standard television signal to the CRT device 10. This signal may come from a cable television system or a television receiver external to the terminal system, and is interpreted through the demodulate and decode device 34.

The CRT display device 10 may be one of any available from various manufacturers such as Motorola, C. ITOH, etc., the only requirement being the ability to transform electrical (video) signals into visual representations by modulating an electron beam which strikes phosphor-coated glass and emits visible light.

The video playback disc device 27 is preferably a DISCOVISION ASSOCIATES Model PR-7820 which can provide local storage of high resolution video image and audio information. The principal features of this device are the capability of storing 54,000 individual video frames and synchronized audio playback, which can be accessed sequentially or randomly under control from the central processor 30. The stored information, as for example, travel documentaries, maps, etc., is routed to the CRT 10 under control of the central processor 30, via the video multiplexer 35. The video frame presentation device (vidicom) 36, not unlike in technology to those available from COLORADO VIDEO, INC., will allow display of facsimile information acquired by the central processor from either the mass storage 28 or the remote site computer 42. The purpose of this device is to allow timely information to be encoded at the remote location and transmitted over the serial channel unit by the modems 38, 39 and the audio controller 24, to the terminal computer and subsequently decoded and displayed after routing through the video multiplexer 35.

The alpha-numeric and video display controller 33 provides the capability necessary to support the intended manual-oriented transaction system for user interfacing. This device may be implemented with a METACOMP Model MCV-1023 controller which combines the necessary feature into a bus-oriented controller. The video output of this controller 33 would be displayed on command via video multiplexer 35. The final module of the video display system, the video multiplexer 35, is designed using existing electronic technology, to accept inputs from bus 40, the vidicom 36, the video controller 33, the video disc 27 and the demodulate and decode device 34.

The printer 11 is constituted by a video hard-copy unit, TEKTRONIX Model 4632, which can generate a hard copy in a 21.6×27.9 centimeters (8½″×11″) from a raster scan video source. Any image displayed on the CRT 10 can also be printed in a 21.6×27.9 centimeters (8½″×11″) format on the printer 11.

The card reader module 22 is included to allow input of data from a standard magnetically encoded stripe such as those normally found on credit cards. It may be implemented with AMERICAN MAGNETICS Model 40, which provides electrical signals corresponding to magnetically encoded information on several parallel tracks. Card-reader 22 interfaces with the controller parallel I/O bus. This allows the central processor 30 to sense a card being presented by the customer and to interpret the data. The data would typically be account number, credit limit, name and similar information relevant to a credit card authorization and charge system. The keyboard, not unlike the one provided by KEYTRONICS, consists of a series of keys similar to a typewriter in appearance and mechanical operation. This keyboard can convert the mechanical motion of key depression into an electrical signal which can be sensed by the central processor 30 via the bus 40.

The coinbox [20] *21* is a [FLOW-ONICS] *FLOONICS* Model AL coin acceptor which can accept currency payments for various services or goods provided and communicate to the central processor 30 the amount of change deposited therein by the bus 40.

The voice and audio communication unit 24 allows the terminal computer 30 to provide an audio connection between the terminal user and some remote site, or to route audio outputs from the video disc 27 to the local loud speaker 12 as explained before. The control module *or communication unit* 24 accepts commands from the [terminal computer] *central processor* 30 and connects a typical telephone handset 25 to a telephone line or similar voice grade communication technique via a modem 38. The central processor 30 is equipped with a serial interface 43 compatible with most modem required input formats.

The on-line mass storage unit 28 is a floppy disc device available from SHUGART ASSOCIATES and has a control interface compatible with the I/O bus 40. The central processor 30 is able to store and subsequently retrieve data from the on-line mass storage module [31] *28* on command.

Figure 11:
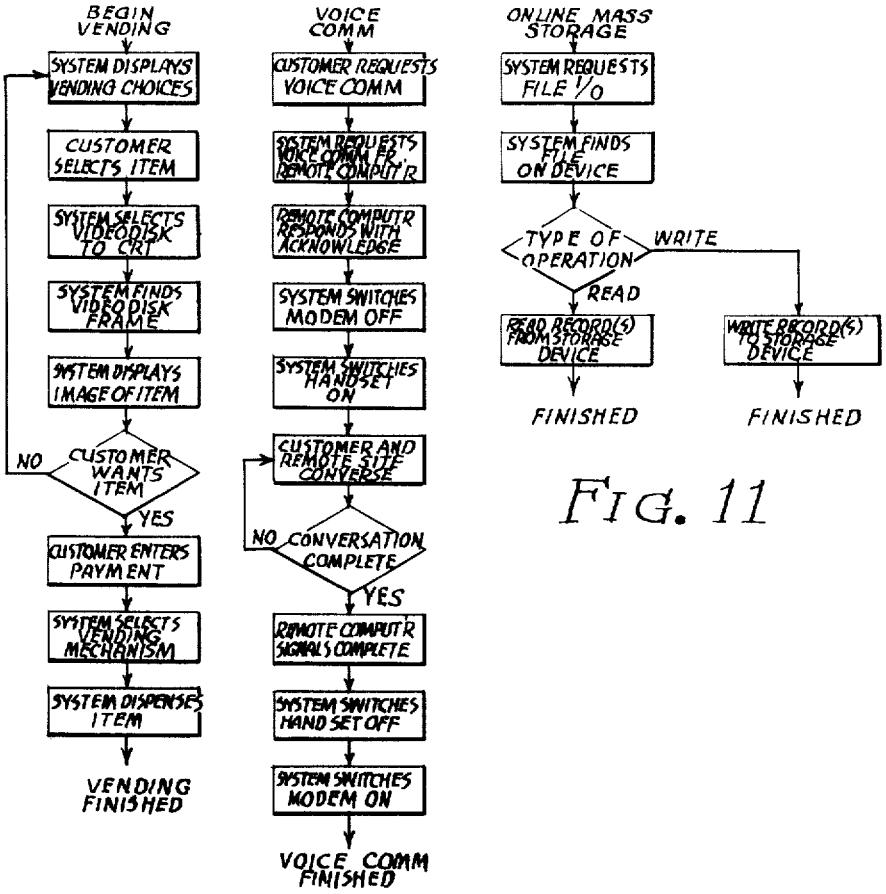

The interfacing of the various components of the system as described above is done according to standard practices well known to those skilled in the electronic arts. The operation of the central processor unit 30 which acts as a decision-making machine, is directed from the operational program stored in the read only memory 31. The application program is derived from the on-line mass storage 28. The application program is of a "menu-type" and can be best understood by reference to the flow diagrams of FIGS. 9, 10 and 11. In order to illustrate the capabilities of the terminal, the operational program will be discussed in connection with five operations: the display of travel documentaries, the display of flight schedules, securing reservations on a particular flight, the issuance of a flight ticket, and the control of the vending machine.

The operation of the terminal is primed by the [customer's] *customer* dropping a dime in the coinbox slot. As explained before, the coinbox generates a coded signal indicative of the amount of change deposited. This signal is immediately sensed by the central processor which addresses the mass storage unit and fetches from it the basic list or menu of the services available. This information is then transmitted via the video multiplexer to the CRT where the list of services available is displayed in columnar form with, adjacent to it the key symbol to be entered by the customer in making its selection. The customer may, for instance, be requested to enter a "D" in order to obtain a listing of all the travel documentaries available, A "S" to check a flight schedule, and so on. Assuming now that the customer [enter] *enters* a "D" on the keyboard, the central processor addresses the video-disc storage unit and fetches from it a list of all documentaries recorded thereon. This list is again routed through the video multiplexer to be displayed on the CRT. The name of the various documentaries are indexed with an alpha-numerical code which the customer is asked to use in making [its] *his* selection. Once this code is entered via the keyboard, it is used by the central processor to address the video-disc storage to the area containing the selected documentary. After the documentary has been run, the basic menu is again displayed on the CRT and the system is ready for an alternate selection to be made by the customer. If no selection is made within the next thirty seconds, the system returns to a standby status until primed again by deposit of the required change.

The flight schedule program begins by the display on the CRT of a schedule mask through which the customer is invited to fill in the form and to locations of the flights. When the customer enters the departure point and the destination on the keyboard, two codes are generated which are used to seek the appropriate information in the mass storage or, alternately, are sent via the audio communication system to a remote reservation computer. When the list of available flights has been gathered from the mass storage or received back from the remote computer center, it is displayed on the CRT with an inquiry as to whether the customer wants a hard copy of the schedule. The amount of change to be deposited in order to obtain the hard copy is also displayed. When the proper amount of change is detected in the coinbox, the central processor generates a code which is recognized by the printer as a signal to print the raster scan image being generated on the CRT. At the end of the printing sequence the customer is offered the choice to jump immediately into the flight reservation mode or to return to the basic menu display.

The reservation sequence begins with the display of a mask from the CRT requesting such information as the flight number, number of passengers, and other information such as smoking or non-smoking section preferences. After the mask has been completed by the customer entering his selection, the central processor generates a request message which is sent via the audio communication system to the remote reservation computer. After receiving the confirmation message, the system again offers the customer the option to obtain a hard copy of the reservation information, after which the system offers the option to go directly into a ticket purchase mode, or a return to the basic menu display.

The flight ticket delivery program requires from the customer the payment of the fare through a credit card. The price to be paid is fetched [upon] *from* the mass storage and displayed uopn the CRT. The introduction of a credit card into the credit card reader triggers a sequence during which the account number and the amount being charged are sent to a remote credit center where the credit line is verified and the transaction is recorded. The acceptance message received back from the computing center causes the CPU to generate a video image of a flight ticket which is simultaneously printed by the video hard copy printer.

The computer-controlled goods dispensing program is also initiated by a video display of the lists of items available for sale. Upon selection of the item by this alpha-numerical indexing number, the system selects from the video-disc a sequence of images illustrating the product. The customer at that point is offered a choice to purchase the item by depositing the amount indicated, or to return to the item list display mode for an alternate selection. Once the payment has been recognized in the coinbox, the carousel of the vending machine is allowed to rotate until a matching code is detected in the back of the appropriate station, at which point the computer triggers the dispense sequence discussed earlier. Illustrated in FIG. 10 is the flow diagram of a program for establishing a voice communication with a remote site and for the transfer of data between the mass storage and a remote data center. These sequences are of a very common type for which software packages are readily available for most common types of central processors.

The operational sequences just described are illustrative of the versatility of the terminal. The system can be adapted to various tasks related to the delivery of travel services by mere software changes. The terminal [could conceivably] *may* be used to promote and sell a variety of services and to facilitate financial transactions. Its comprehensive communication interface makes it an ideal tool for catalogue sales from a central warehouse and an adequate substitute in many cases for the retail store. The terminal could also be adapted to the delivery of a higher grade of services as professional advice and counseling.

While the preferred embodiment of the invention has been described and modifications thereto have been suggested, other implementations may be devised which can be adapted to a variety of applications without departing from the spirit of the invention and the scope of the appended claims.

We claim:

1. An automatic vending apparatus operable by a customer which comprises:

means for selectively promoting by audio-visual presentation, the sale of services;

means for accepting orders for said services;

means for collecting payments for said services;

means for delivering to said customer at least one document allowing access to said services;

a programmable machine responsive to the request of said customer for directing the operation of said various means;

a cabinet housing said various means and programmable machine;

said automatic vending apparatus further comprising:

(i) a ring-shaped carousel having a plurality of box-like stations, each having an opening at the bottom;

(ii) means for rotating said carousel;

(iii) within each station, releasable means for holding goods above said opening;

(iv) a pocket under said ring for receiving goods falling through the opening of a particular station positioned immediately above said pocket; and (v) means for releasing the means for holding of said particular station.

2. The apparatus claimed in claim 1 wherein said releasable means comprise:

a hopper having its lower section pivotally connected to said carousel along a horizontal axis; and a spring-tensioned latch for holding said hopper in the upright position.

3. The apparatus claimed in claim 2 wherein said means for releasing comprise:

a solenoid positioned in relation to the latch of said particular station so as to release said latch when said solenoid is activated.

4. The apparatus claimed in claim 3 which further comprise:

means for collecting payments for said dispensed goods;

means for detecting the identification of each of said stations when it is positioned above said pocket;

means for coordinating said payment with said identification; and means responsive to said means for coordinating, for enabling said means for releasing.

5. The apparatus claimed in claim 4 wherein said means for promoting comprise a cathode ray tube display unit and a video information storage unit supplying said display unit with a plurality of video programs describing said services.

6. The apparatus claimed in claim 5 which further comprises a keyboard operable by the customer for entering requests into said machine.

7. A substantially self-contained apparatus dimensioned to be easily transported and installed at a commercial location comprising:

an audio-visual means for selectively dispensing information from a plurality of data sources;

customer operated means for selecting information to be dispensed on said audio-visual means *including means for sequentially and interactively displaying alternate selections of information on said audio-visual means in response to customer's commands*;

a first data source comprising a first mass-storage means containing [product and service information] *a first set of information about goods or services;*

*means for remotely updating said first set of information from another location*;

a second data source comprising a second mass-storage means containing [product and service information and system-operation directions] *a second set of information about goods or services and instructions for the operation of the apparatus;* electromechanical means for selectively dispensing goods from a plurality of holding stations;

means operated by the customer for selecting goods to be dispensed by said electromechanical means;

at least one electromechanical means for printing information derived from said data sources;

at least one electromechanical means for accepting payment for said goods and services from the customer; and means for directing the operation of said audio-visual means, said means operated by the customer, said data sources and said electromechanical means, said means for directing comprising means for holding an operational sequencing list and a decision-making machine responsive to the status of said various means for controlling their operations *in accordance with said instructions.*

8. An apparatus for automatically dispensing goods and services to a customer which comprises:

an audio-visual means for selectively dispensing information from a plurality of data sources;

customer operated means for selecting information to be dispensed on said audio-visual means *including means for sequentially and interactively displaying alternate selections of information on said audio-visual means in response to customer's commands*;

a first data source comprising a first mass-storage means containing product and service information;

a second data source comprising a second mass-storage means containing product and service information and system-operation directions;

electromechanical means for selectively dispensing goods from a plurality of holding stations;

means operated by the customer for selecting goods to be dispensed by said electromechanical means;

at least one electromechanical means for printing information derived from said data sources;

at least one electromechanical means for accepting payment for said goods and services from the customer;

means for directing the operation of said audio visual means, said means operated by the customer, said data sources and said electromechanical means, said means for directing comprising means for holding an operational sequencing list and a decision-making machine responsive to the status of said various means for controlling their operations;

said data sources further comprising:

(i) a third data source comprising at least one remotely located mass storage and telecommunication means for transferring data from said remotely located mass storage to said audio visual means; and (ii) means for remotely updating the product and source information and for updating the system operation directions contained in said second data source.

9. The apparatus claimed in claim 8 wherein said audio-visual means comprise a cathode ray tube display unit;

said means for selecting information and said means for selecting goods comprise a keyboard operable by the customer;

said first data source comprises a video information recording unit;

said second data source comprises a randomly accessible electronic storage unit; and said electromechanical means for printing comprises a printing machine responsive to a video raster scan signal.

10. The apparatus claimed in claim 9 wherein said first data source comprises documentary films on travel and vacation opportunities;

said second data source comprise transportation schedules, fare, and reservation information; and said remotely located mass storage comprises a computerized flight reservation system.

11. A substantially self-contained apparatus dimensioned to be easily transported and installed at a commercial location comprising:

an audio-visual means for selectively dispensing information from a plurality of data sources;

customer operated means for selecting information to be dispensed on said audio-visual means, *including means for sequentially and interactively displaying alternate selections of information on said audio-visual means in response to customer's commands*;

a first data source comprising a first mass-storage mean containing [product information] *a first set of information about goods or services;*

*means for remotely updating said first set of information from another location*;

a second data source comprising a second mass-storage means containing [product information and system operation directions] *a second set of information about goods or services and instructions for the operation of the apparatus*;

*at least one* electromechanical means for dispensing [product] *information or goods*;

means operated by the customer for selecting [product] *at least one item* to be dispensed by said electromechanical means; [at least one electromechanical means for printing information derived from said data source;]

at least one electromechanical means for accepting payment for said [product] *item* from the customer; and means for directing the operation of said audio-visual means, said means operated by the customer, said data sources and said electromechanical means, said means for directing comprising means for holding an operational sequencing list and a decision-making machine responsive to the status of said various means for controlling their operations *in accordance with said instructions.*

* * * * *

UNITED STATES PATENT OFFICE
CERTIFICATE OF CORRECTION

PATENT NO. : RE 32,115

DATED : April 15, 1986

INVENTOR(S) : LAWRENCE B. LOCKWOOD, et al.

It is certified that error appears in the above-identified patent and that said Letters Patent is hereby corrected as shown below:

In Claim 7, column 10, line 3 and Claim 11, column 12, line 6:

substitute --a second-- for "said first".

In Claim 7, column 10, line 7 and Claim 11, column 12, line 10:

substitute --said-- for "a".

Signed and Sealed this

Eighteenth Day of September, 1990

*Attest:*

*Attesting Officer*

HARRY F. MANBECK, JR.

*Commissioner of Patents and Trademarks*

US001032115B1

REEXAMINATION CERTIFICATE (3294th)

United States Patent [19]

Lockwood et al.

[11] B1 Re. 32,115

[45] Certificate Issued Aug. 12, 1997

[54] SELF-SERVICE TERMINAL

[75] Inventors: Lawrence B. Lockwood, 5935 Folsom Dr., La Jolla, Calif. 92037; Michael Wells; Henri J. A. Charmasson, both of San Diego, Calif.

[73] Assignee: Lawrence B. Lockwood

Reexamination Request:
No. 90/004,372, Sep. 18, 1996

Reexamination Certificate for:

| | |
|---|---|
| Patent No.: | **Re. 32,115** |
| Issued: | **Apr. 15, 1986** |
| Appl. No.: | **671,705** |
| Filed: | **Nov. 15, 1984** |

Certificate of Correction issued Sep. 18, 1990.

Related U.S. Patent Documents

Reissue of:

| | |
|---|---|
| [64] Patent No.: | **4,359,631** |
| Issued: | **Nov. 16, 1982** |
| Appl. No.: | **168,953** |
| Filed: | **Jul. 11, 1980** |

[51] Int. Cl.[6] ..... G06E 7/08

[52] U.S. Cl. ..... 235/381; 194/217; 348/5.5; 358/400; 360/12

[58] Field of Search ..... 235/381

[56] References Cited

U.S. PATENT DOCUMENTS

| | | | |
|---|---|---|---|
| Re. 30,773 | 10/1981 | Glaser et al. | 235/379 |
| 3,445,633 | 5/1969 | Ratner | 235/61.7 |
| 3,609,250 | 9/1971 | Morris | 179/100 |
| 3,622,995 | 11/1971 | Dilks et al. | 340/153 |
| 3,705,384 | 12/1972 | Wahlberg | 340/149 |
| 4,070,698 | 1/1978 | Curtis et al. | 360/12 |
| 4,173,024 | 10/1979 | Miller | 358/115 |
| 4,186,438 | 1/1980 | Benson et al. | 364/200 |

(List continued on next page.)

FOREIGN PATENT DOCUMENTS

| | | |
|---|---|---|
| 50-98626 | 8/1975 | Japan . |
| 52-72800 | 5/1977 | Japan . |
| 54-60000 | 5/1979 | Japan . |
| 1437883 | 6/1976 | United Kingdom . |
| 1504112 | 3/1978 | United Kingdom . |
| 1504113 | 3/1978 | United Kingdom . |

OTHER PUBLICATIONS

DiscoVision Associates brochure circa 1979 pp. 1–11.

*IEEE Transactions on Human Factors in Electronics*, Mar. 1967, pp. 5–15 "Display–Selection Techniques for Text Manipulation" by W. K. English et al.

(List continued on next page.)

*Primary Examiner*—Donald T. Hajec

[57] ABSTRACT

A self service terminal for dispensing voice and video information, printed documents, and goods; and for accepting service orders and payments therefor by currency or credit card. The terminal comprises a cathode ray tube display with mass storage for presenting information about the product or service sold, a keyboard for entry of customer requests, a printer for delivering coupons and tickets, a vending machine for dispensing small items, a coinbox and credit card reader for accepting payments for goods and services, and a telephone interface for communicating with the staff of a command center. The operation of the terminal is controlled by a microprocessor linked to an automated reservation system. The preferred embodiment of the invention is dedicated to the promotion and sale of travel services. The terminal is operated from three memory devices. A non-volatile memory is used to store the operating program for the terminal. A semi-permanent storage in the form of a video disc is used to hold the travel documentaries and other sales presentations. A randomly accessible mass storage is used to record flight schedules, hotel occupancy and other variables which are periodically updated from the command center via a phone line data communication link. The vending machine is used primarily for dispensing travel brochures, maps, foreign currencies and other goods related to the contemplated travel.

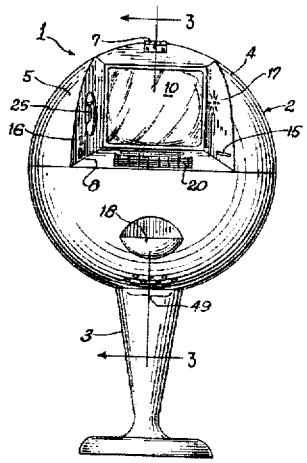

U.S. PATENT DOCUMENTS

| | | | |
|---|---|---|---|
| 4,190,819 | 2/1980 | Burgyan | 340/23 |
| 4,193,114 | 3/1980 | Benini | 364/200 |
| 4,247,759 | 1/1981 | Yuris et al. | 235/381 |
| 4,254,329 | 3/1981 | Gokey et al. | 235/379 |
| 4,300,040 | 11/1981 | Gould | 235/381 |
| 4,319,336 | 3/1982 | Anderson et al. | 364/900 |

OTHER PUBLICATIONS

*Proceedings of the IEEE*, vol. 60, No. 11, Nov. 1972 pp. 1423–1431 "A Case Study: Airlines Reservations Systems" by John R. Knight.

*Auerbach Publishers, Inc.*, 1972 pp. 15–40, 71–74, 84–92, 118–122 "Data Collection Systems".

*SMPTE Journal*, vol. 86, No. 4, Apr. 1977, pp. 201–203 "Educational/Institutional Features of the Optical Videodisc System" by R. T. Cavanagh.

*Wyckoff, N.J. News*, Nov. 10th, 1977 "New Computer Revolutionizes Travel Plans".

*Distributed Computing Systems*, Oct. 1979 pp. 699–705 "Centralized Control Update Algorithms for Fully Redundant Distributed Databases" by Hector Garcia–Molina.

*Vending Times*, Nov. 1979, p. 75 "Wurlitzer Card Control".

*Vending Times*, Dec. 1979, p. 5 "Japanese Firm Develops Talking Vending Machine".

*Business Week*, Apr. 7, 1980, p. 82B "AmEx's Complex Global Travel Net".

*Business Week*, Apr. 7, 1980 pp. 81–82. "Computer Rescue for Travel Agents".

*Video Discs*, by Efrem Sigel et al., Knowledge Industry Publications, Inc. 1980, pp. 1–181.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

* * * * *